US006500544B1

(12) United States Patent
Tiitu et al.

(10) Patent No.: US 6,500,544 B1
(45) Date of Patent: Dec. 31, 2002

(54) CORROSION RESISTANT COATINGS (75) Inventors: Mari Tiitu, Helsinki (FI); Anja Talo, Espoo (FI); Kurt Blomqvist, Espoo (FI); Matti Jussila, Porvoo (FI); Olli Ikkala, Helsinki (FI)

(73) Assignee: Panipol Oy, Porvoo (FI)

( * ) Notice: Subject to any disclaimer, the term of this patent is extended or adjusted under 35 U.S.C. 154(b) by 112 days.

(21) Appl. No.: 09/654,897

(22) Filed: Sep. 5, 2000

(30) Foreign Application Priority Data

May 15, 2000 (FI) ............................................. 20001164

(51) Int. Cl.⁷ ............................................. B32B 27/38
(52) U.S. Cl. ........................ 428/413; 428/416; 428/457; 428/458; 427/388.2; 427/386; 427/388.1; 524/500; 524/502; 524/540; 525/185; 525/540
(58) Field of Search .................................. 428/413, 416, 428/457, 458; 525/185, 540; 524/502, 500, 540; 427/388.2, 386, 388.1

(56) References Cited

U.S. PATENT DOCUMENTS

| | | | |
|---|---|---|---|
| 4,913,867 A | | 4/1990 | Epstein et al. .............. 264/104 |
| 5,278,213 A | | 1/1994 | Han et al. ................... 524/233 |
| 5,441,772 A | * | 8/1995 | McAndrew .............. 427/388.1 |
| 5,645,890 A | | 7/1997 | MacDiarmid et al. ...... 427/302 |
| 5,648,416 A | * | 7/1997 | Miller ........................ 524/500 |
| 5,658,649 A | | 8/1997 | Wrobleski et al. .......... 428/215 |
| 5,824,371 A | | 10/1998 | Epstein et al. ........... 427/388.1 |
| 5,853,621 A | * | 12/1998 | Miller ........................ 252/500 |

FOREIGN PATENT DOCUMENTS

| | | |
|---|---|---|
| CN | 96122196 | 12/1996 |
| EP | 0581886 B1 | 4/1992 |
| EP | 0623159 B1 | 1/1993 |

OTHER PUBLICATIONS

"Effectiveness of Organic Compounds as Pickling Inhibitors in Hydrochloric and Sulfuric Acid", R.M. Hudson & C.J. Warning; Oct. 1966, Metal Finishing, pp. 58–63.
"Modification of the Electrochemical and Corrosion Behavior of Stainless Steels with an Electroactive Coating", David W. DeBerry; Behavior of Stainless Steels, vol. 132, No. 5, pp. 1022–1026, May 1985.
"Improved Solution Stability and Spinnability of Concentrated Polyaniline Solutions Using N,N'–Dimethyl Propylene Urea as the Spin Bath Solvent", Tzou & Gregory; Synthetic Metals 69 (1995), pp. 109–.
"Properties and Polymers", Van Krevelen; Elsvier, 1990, Chapter 7, Cohesive Properties and Solubility, pp. 189–225.

(List continued on next page.)

Primary Examiner—Leszek Kiliman
(74) Attorney, Agent, or Firm—Birch, Stewart, Kolasch & Birch, LLP (57) ABSTRACT A two-component curable paint composition comprises a base component containing at least one curable resin, and a hardening component which contains a non-conducting polyaniline, and a liquid-phase or molten-phase curing agent capable of curing said curable resin of the resin component and capable of dissolving non-conducting polyaniline. According to the invention, the curing agent comprises an organic amine compound having at least two primary amine functions linked together by a hydrocarbon chain which is optionally interrupted by at least one heteroatom, said amine compound exhibiting irregularities in the chemical structure of its hydrocarbon chain. The invention also provides a method of preparing paint compositions, a method of forming a paint coating on the surface as well as a coated metal surface. The solutions produced by the invention are stable over extended periods of time, and the anti-corrosive erect of the paint compositions is good even at very low concentrations of the polyaniline.

39 Claims, 6 Drawing Sheets

OTHER PUBLICATIONS

Handbook of Conducting Polymers, $2^{nd}$ Ed.; Skothein; Elsenbaumer, Reynolds; Chap. 31, Corrosion Inhibition of Metals by Conductive Polymers, pp. 881–920, 1998.

Paint and Surface Coatings, Theory and Practice, $2^{nd}$ Ed., Lambourne & Strivens, William Andrew Publishing; Pigments for Paints, pp. 159–165, 1996.

"Effect of Various Substituents in Thiophene on the Inhibitor Efficiency", Szklarska–Smialowska & M. Kaminski; Corrosion Science, 1973, vol. 13, pp. 1–10.

"Studies on the Inhibition of Amines of the Corrosion of Iron by Solutions of High Acidity", C.C. Nathan, Corrosion–National Association of Corrosion Engineers, vol. 9., pp. 199–202, 1952.

Synthetic Metals 102 (1999) 1377–1380; "Polyaniline as marine antifouling and corrosion–prevention agent".

* cited by examiner

CORROSION RESISTANT COATINGS

BACKGROUND OF THE INVENTION

1. Field of Invention

The present invention relates to anticorrosive paints for metals. More particularly, it relates to paints comprising conjugated polymers as corrosion preventing agents and to methods for the preparation thereof. The present invention also concerns a method of forming a paint coating on the surface of an object and coated metal surfaces comprising an anticorrosive paint composition.

2. Description of Related Art

Corrosion of metal surfaces, such as steel, is a significant problem and in the prior art several ways of different efficiencies have been suggested for solving this problem. The simplest procedure is to passively coat the metal surface with a paint, comprising epoxies, alkyds, polyurethanes, phenolics, and the like. It provides protection if the coating is perfect (defect-free) and does not allow significant diffusion of water, oxygen, electrolytes and the like through it. A common technique is to add additives to paint formulations to provide active protection. Zinc and zinc-containing additives, such as zinc chromates, zinc phosphates, or calcium plumbate, are commonly added to the paints to allow cathodic protection. Detailed description of the prior art of the corrosion-inhibiting pigments can be found e.g. in Paints and surface coating, by R. Lambourne and T. A. Strivens, Woodhead Publishing, Ltd, 1999, pp. 162–165. There has, however, been a push towards reducing or eliminating heavy metal pigments for safety and environmental reasons, and therefore new concepts are called for.

The use of conjugated oligomers and polymers as coatings or additives of coatings to provide anticorrosion effects has been extensively reviewed in the art (W.-K. Lu, S. Basak, and R. L. Elsenbaumer, in Handbook of Conducting Polymers, Marcel Dekker, Inc. 1998, p. 881). It has been suggested to use oligomeric pyrroles or substituted pyrroles as corrosion inhibiting additives (R. M. Hudson and C. J. Warning, Metal Finish. 64 (1966) 63). Also oligomeric aniline has been described to be an inhibiting additive for mild steel such as in hydrochloric acid solution (C. C. Nathan, Corrosion 9 (1953) 199). Oligomeric thiophenes have also been described (Z. Szklarska-Smialowska and M. Kaminski, Corros. Sci. 13 (1973) 1). It can be concluded that conjugated oligomers are shown in the prior art to have corrosion inhibiting properties. However, their toxicity limits their widespread use in practical coatings, as there is a difficulty to bind the oligomers perfectly in the coating to provide mechanical and environmental stability.

Conjugated polymers can in principle be used to overcome this problem. A. G. MacDiarmid suggested use of conducting conjugated polymers to allow anodic protection of steel and other metals (Lecture Series at State University of New York, 1985). D. W. DeBerry (J. Electrochem. Soc. 132 (1985) 1022) found that polyaniline electrochemically deposited on stainless steel provides anodic protection. Since then, there has been considerable effort to develop methods based on conjugated polymers, such as substituted polythiophenes, polypyrroles and polyanilines. There, however, is a major and extensively reported complication due to the rigidity of the conjugated polymer chains: In the general case such materials do not melt and dissolve only in rare or in some cases no solvents due to low conformational entropy (J. I. Kroschwitz, High Performance Polymers and Composites, Wiley, 1991). This central observation can be illustrated using polymers having closely related flexible and rigid modifications: 1) Flexible pyridine containing polymers, such as poly (4-vinyl pyridine) dissolve in a wide variety of solvents, such as alcohols (methanol, ethanol and the like), phenols (m-cresol and other alkyl phenols), halogenated solvents (chloroform, tetrachlorobenzene and the like), amines (N-methyl pyrrolidone, and the like), acids (formic acid, sulphonic acids); 2) Rigid conjugated polymer poly(p-pyridine) dissolves only in few of the solvents listed above, i.e. formic acid (in the unprotonated form), strong acids such as methane sulphonic acid (in the protonated form) and dichloroacetic acid. A commonly used method to identify solvents is based on matching solubility parameters (D. W. Van Krevelen, Properties of polymers, Elsevier, N.Y., 1990, p. 875). The solubility parameters can be evaluated using group contribution methods to render $\delta=22.4$ $\sqrt{MPa}$ for poly(4-vinyl pyridine) and a $\delta=21.7$ $\sqrt{MPa}$ for poly(p-pyridine), which would suggest that the two polymers should have essentially the same solvents. The fact that only few of the solvents of poly(4-vinyl pyridine) are also solvents for polyp-pyridine) demonstrates that solubility parameters have only a marginal predictive power of identifying solvents for rigid polymers, such as conjugated polymers, like polyaniline. In spite of this well documented inconsistency, there have been efforts to use solubility parameters to identify solvents for polyaniline, as disclosed in U.S. Pat. No. 5,278,213.

Due to the generic poor solubility of the rigid polymers, finding suitable processing routes to produce coatings, in particular anticorrosion coatings, becomes particularly challenging, and preparation of coatings and identifying solvents are intimately connected. It is well known in the prior art that solvents for neutral and doped conjugated polymers are different in the general case. The present application deals with neutral conjugated polymers. Several solvents for undoped (neutral) polyaniline have been experimentally identified and disclosed. U.S. Pat. No. 4,913,867 describes N-methyl pyrrolidone (NMP) as a solvent for neutral polyaniline. Closer studies reveal that such solutions are unstable against gelation upon prolonged storage (K. T. Tzou and R. V. Gregory, Synthetic Metals 69 (1995) 109). Other solvents have also been reported, such as dimethyl sulfoxide, dimethyl formamide, and N,N'-dimethyl-propylene urea. U.S. Pat. No. 5,278,213 describes a wide variety of solvents and claims solvents with sufficiently high polarity with relative dielectric constant larger than 5, dipole moment greater than $3.5 \cdot 10^{-30}$ Cm, net hydrogen bonding capability greater than ca. 50, and Hildebrand solubility parameter from ca. $^{17}\sqrt{MPa}$ to ca. $^{29}\sqrt{MPa}$. In addition to the problems to classify solvents of rigid polymers by solubility parameters, said patent specification describes solely the use of polyaniline/solvent solutions where all or portion of said solvent is removed from said solution in the end to form solidified neutral polyaniline coatings (col 4 lines 21–24 and col 14 lines 16–24). Further, it should be pointed out that U.S. Pat. No. 5,278,213 does not present or anticipate a case where the solution would be crosslinked instead of its removal.

EP Patent Specification No. 0 581 886 B1 discloses a concept where a neutral polyaniline forms a fine dispersion wit particle size less than 100 nm within a liquid medium where the latter is removed in the end, and where said article is doped for conductivity, unlke in the present invention which deals concepts for neutral non-conducting articles. EP Patent Specification No. 0 623 159 B1 relates to paints based on neutral conjugated polymers dispersed in liquid medium which allows for an anticorrosion effect when the amount of conjugated polymer is from 3 to 20% by weight in the final dried paint, including the binder. As the conjugated polymer is only dispersed as separate particles within the paint without forming more continuous structures (as discussed in the specification of said patent: cf. p. 2, lines 20 and 28), the concentration required to show anticorrosion effect is relatively high. Therefore, there is a need for new ways of obtaining a more uniform distribution of conjugated polymers, not based on dispersions but based on solutions.

U.S. Pat. No. 5,441,772 describes the use of neutral polyaniline solutions to provide coatings which, upon removal of the solvent, render corrosion protection of steel. U.S. Pat. No. 5,441,772 discloses that the composition can include other polymers that are miscible with polyaniline. As neutral polyaniline is immiscible with epoxy resin (see Example 8 below), such as polycondensated bisphenol diglycidyl ethers, the concept is different from the present invention. U.S. Pat. No. 5,658,649 discloses a method to provide two-layer structure where a doped conducting polyaniline is mixed with epoxy resin and cured. Subsequently a second layer, i.e. a topcoat, is added to provide increased mechanical integrity. Unlike our work, U.S. Pat. No. 5,658,649 deals with the conducting form of polyaniline. U.S. Pat. No. 5,645,890 again describe solutions of neutral undoped polyaniline films cast from solvents, such as N-methyl pyrrolidone or dimethyl sulphoxide, upon removal of the solvent. U.S. Pat. No. 5,648,416 describes a wide variety of paint formulations where the neutral undoped polyaniline is dispersed within said paint formulations consisting of one or more binders dispersed within a liquid medium. As solubility is not pursued and polyaniline is in the form of dispersed particles, the required amount of polyaniline is relatively high, as demonstrated in the examples therein. Therefore, new options are called for to provide compositions with smaller amount of polyaniline. U.S. Pat. No. 5,853,621 relates to non-conducting coatings where dispersed polyaniline is used.

The prior art briefly reviewed above describes several concepts to allow anticorrosion coatings based on conducting polymers. Neutral undoped polyaniline is a feasible candidate to inhibit corrosion propagation under nearly neutral conditions. Taking also into account its economics, a wide variety of concepts based on polyaniline has been discussed in the prior art either based on solution casting where a solvent is totally or partly removed at the end to allow solid neutral coating or dispersion where the neutral polyaniline has been dispersed in a wide variety of paint formulations. The first case deals with evaporation of large amounts of volatile potentially harmful organic solvents and the latter case requires relatively large amount of dispersed polyaniline particles to allow anticorrosion effect.

An interesting approach to the manufacture of coatings from non-conducting polyaniline and epoxy resins is discussed by X.-H.Wang et al. In Polyaniline as marine antifouling and corrosion-prevention agent, Synthetic Metals 102 (1999) 1377. According to Wang, a solvent free corrosion prevention coating based on epoxy and neutral polyaniline could be produced by dissolving emeraldine base in tetraethylene pentaamine, which is mentioned as a curing agent of epoxy resin.

Tests made with the amine suggested by Wang, and disclosed in more detail below, have showed, however, that the solution of emeraldine base in tetraethylene pentaamine (TEPA) is not stable. Within a week the solution will turn cloudy, which indicates precipitation and segregation. As a result, the anticorrosive effect of paint compositions incorporating segregated mixtures of tetraethylene pentaamine and emeraldine base will be subtantially poorer, see Example 12 as well as FIGS. 6 and 7.

SUMMARY OF THE INVENTION

It is an object of the present invention to provide a novel two-component curable paint composition, comprising a curable binder and a hardener.

It is another object of the invention to provide a method of preparing a two-component paint composition.

It is a third object of the invention to provide a method of forming a paint coating on the surface of an object It is a fourth object of the invention to provide coated metal substrates with improved corrosion resitivity.

These and other objects, together with the advantages thereof over known methods and products, which shall become apparent from the specification, which follows, are accomplished by the invention as hereinafter described and claimed.

The present invention is based on the finding that polyaniline can be dissolved in a specific group of curing agents comprising an organic amine having primary amine groups to form stable solutions. The amines of the present kind have irregularities in the chemical structure of its hydrocarbon chain. These irregularities comprise either branches or unsaturation in the chain, or both.

Surprisingly, and contrary to the teaching of the prior art cited above, the amines according to the present invention are very effective solvents of polyaniline even if they are primarily less polar and have a rather low solubility parameter.

According to a preferred embodiment, neutral polyaniline is dissolved in one or more basic hardeners of epoxy resins that form stable solutions optionally containing also other additives and the mixture is thereafter cross-linked to form solid surface coatings.

The method of forming a paint coating on the surface of an object typically includes the steps of i) dissolving neutral polyaniline in an epoxy hardener, optionally containing also other additives;

ii) mixing epoxy resin, optionally containing also other additives, in the said polyaniline/hardener mixture, iii) optionally adding further additives;

iv) applying the mixture on the surface of an object; and iii) curing the coating More specifically, the present invention is mainly characterized by what is stated in the characterizing part of claim 1.

The method according to the present invention of preparing paint compositions is characterized by what is stated in the characterizing part of claim 25.

The method of forming a paint coating on the surface of an object is characterized by what is stated in the characterizing part of claim 32, and the coated metal surface is characterized by what is stated in the characterizing part of claim 37.

Considerable advantages are obtained. Thus, the present invention represents a straightforward and economically attractive procedure for producing coatings and coated articles based on solutions of neutral undoped polyaniline. Instead of solvent removal the invention provides for cross-linking of the polyaniline using polymeric or oligomeric resins to produce neutral polyaniline coatings that have anticorrosion effect at lower concentration of said polyaniline than allowed by dispersion techniques.

The solutions produced by the invention are stable over extended periods of time, which facilitates storage, and transportation of the paint compositions. The anti-corrosive effect of the paint compositions is good even at very low concentrations of the polyaniline. Surprisingly it has been observed that tie required amount of polyaniline is low, typically about 1% by weight, to allow for a substantial anticorrosion effect.

DETAILED DESCRIPTION OF THE INVENTION

When the term "polyaniline" is used in this application, it is used generally to include substituted or unsubstituted polyanilines or polyaniline copolymers, or mixtures thereof, unless the context is clear that a specific unsubstituted form is intended. The term "neutral" refers to the case where the polyaniline is not doped by electron or proton transfer and the conductivity is low, less than about $10^{-6}$ S/cm.

Polyaniline (or abbreviated PANI) is well known in the art, and its synthesis and the preparation of the electrically non-conductive forms thereof have been described in great detail in the prior art which also describes the preparation of conductive forms of the non-conductive polymer by, for example, contacting polyanilines with protonic acids resulting in salt complexes [cf., for instance, A. G. Green, and A. E. Woodhead, "Aniline-black and Allied Compounds, Part 1," J. Chem. Soc. 101 (1912) 1117; Kobayashi, et al., "Electrochemical Reactions . . . of Polyaniline Film-Coated Electrodes," J. Electroanal. Chem. 177 (1984) 281; U.S. Pat. Nos. 3,963,498, 4,025,463, 4,983,322 and 5,232,631; J.-C. Chiang and A. G. MacDiarmid, "Polyaniline: Protonic Acid Doping of the Emeraldine Form to the Metallic Regime", Synthetic Metals 13 (1986) 196; W. R. Salaneck et al., "A Two-Dimensional-Surface "State" Diagram for Polyaniline", Synthetic Metals 13 (1986) 297]. Typical examples of protonic acids disclosed in the above prior art are HCl, $H_2SO_4$, sulfonic acids of the type $R_1$—$SO_3H$, wherein $R_1$ stands for a hydrocarbon residue, phosphoric acids, etc. Such acids form salt complexes with polyaniline, which may exhibit electrical conductivities of $10^{-3}$ S/cm or more. Owing to their electrical properties, these so-called "doped" polyanilines [or, as used hereinafter, polyaniline salt complexes], and their blends and compounds with common insulating bulk polymers, are suitable for a variety of the anti-static and shielding applications that are currently served by metal or carbon black filled polymer composition.

When the term "electrically non-conducting polyaniline" is used in this application, it is used generically to denote electrically non-conducting unsubstituted and substituted polyanilines and electrically non-conducting polyaniline copolymers, and mixtures thereof. As mentioned above, these may be rendered electrically conducting by applying one or more strong protonic acids with $pK_a$ value of less than about 3.0 as counter-ions.

The polyaniline used for the preparation of the non-conductive polyaniline employed in the present invention can be in any of its physical forms. Illustrative of useful forms are those described in U.S. Pat. Nos. 5,232,631 and 4,983,322, incorporated by reference herein. For unsubstituted polyaniline, useful forms include leucoemeraldine, protoemeraldine, emeraldine, nigraniline and pernigraniline forms. Useful polyanilines can be prepared by any chemical and electrochemical synthetic procedures referred to, for example, in the above publications incorporated herein by reference.

As a component of the present paint compositions there may be used an electrically non-conducting unsubstituted or substituted polyaniline salt complex or an electrically non-conducting polyaniline copolymer salt complex, or mixtures thereof, as described in U.S. Pat. Nos. 5,069,820, 5,160,457 and 5,232,631.

Various binders may be employed. When the term "epoxy resin" is used, it is employed for designating molecules containing one or more glycidyl groups. The term "hardener" comprises any chemical compound that is capable of forming a cross-linked network structure when mixed at specific weight fraction with the binder, such as the epoxy resin, at suitable curing temperature.

Preferred epoxy resins are prepared from epichlorohydrin and a dihydroxy compound, usually a bisphenol. Two reactions are involved in the polymerization: condensation to eliminate HCl and addition reactions to open epoxide rings along the chain to produce hydroxyl groups. The polymer has epoxide rings at each end and hydroxyl groups along the chain, which ensure good adhesion to polar surfaces such as metals. Epoxies must be converted to useful cross-linked products by reaction with curing agents, e.g., amines, polyamide resins, polysulfide resins, anhydrides, metallic hydroxides, or Lewis acids. Most of these materials are supplied as two-package systems to be mixed just before application. Polymer curing takes place by reaction of a curing agent with epoxide rings to cross-link the polymer. Paints made from these polymers have excellent chemical resistance and hardness and are often used for corrosion protection, maintenance coatings, trade sales specialties, and industrial finishes. Chalking with exterior exposure and the two-package system limit the use of epoxy finishes.

The epoxy resin can also be reacted with drying oils or fatty acids to produce epoxy esters, which cure by air drying or heat. Paints made with epoxy esters do not have as good chemical and solvent resistance as catalyzed epoxies, but they are superior to oils and alkyds in this respect. They also exhibit chalking on exterior exposure.

Other alternative binders include polyamides, alkyds, polyurethanes, acrylics, polyesters, vinyls, chlorinated rubbers and mixtures of the above mentioned materials. However, for conventional two-component paint compositions the curable resin is preferably selected from the group consisting of epoxy resins and amine resins, and in particular the binder comprises an epoxy resin consisting of condensates of bisphenol and having glycidyl groups.

According to the present invention the curing agent comprises a compound having at least two terminal functional groups, which are spaced apart by a linker group, in the following called "an interlinking hydrocarbon chain". The functional groups of the curing agent are capable of reacting with functional groups of the binder and therefore one molecule of the curing agent is capable of binding together at least two binder molecules to achieve cross-linking of the binder. Preferably the curing agent is a basic amine which comprises primary amine groups which are capable of reacting with functional groups of the binder. In particular, the present curing agent is capable of reacting with the glycidyl groups of the epoxy resin.

The primary amine functions are linked together by a hydrocarbon chain (or generally a "backbone" or "chain") which is optionally interrupted by at least one heteroatom. There are "irregularities" in the chemical structure of its hydrocarbon chain which means that interlinking chain is different from a linear hydrocarbon chain. In particular, the hydrocarbon chain can comprise unsaturation or branching (chain branching). The hydrocarbon chain is preferably interrupted by at least one heteroatom selected from the group consisting of sulphur, silicon, nitrogen and oxygen. The irregularities of the hydrocarbon backbone of the amine can comprise chain branching, e.g. hydrocarbon chains optionally interrupted by heteroatoms and bonded to at least one carbon atom or heteroatom of the hydrocarbon chain interlinking the amine functions. The chain branches can be substituted or unsubstituted. Preferably the substituents of the chain branches comprise functional groups capable of reacting with the resin.

The irregularities of the hydrocarbon chain can also comprise double bonds between two carbon atoms or between a heteroatom and an adjacent carbon atom.

Preferably the curing agent comprises a branched-chain aliphatic amine compounds with at least two primary amine groups and having a solubility parameter for polyaniline of at least 17 MPa$^{1/2}$, and which is capable of dissolving at least 0.5%-wt neutral polyaniline to be essentially particle-free in optical microscopy. It has also been found that the branched amine can be of dendritic form, containing a highly branched core and several primary amine groups at the surface, having a solubility parameter of at least 17 MPa$^{1/2}$ and which is able to dissolve at least 0.5%-wt of neutral polyaniline to be essentially particle-free in optical microscopy. Alternatively, the amine can be an unsaturated aliphatic amine compound with at least two primary amine groups and having a solubility parameter for polyaniline of at least 17 MPa$^{1/2}$ and which is able to dissolve at least 0.5%-wt neutral polyaniline to be essentially particle-free in optical microscopy.

Typically, the amine compound has the formula $$H_2N\text{—}A\text{—}NH_2 \tag{I}$$

wherein A stands for a branched alkylene chain having 3 to 10 carbon atoms or a linear or branched alkenylene chain having 2 to 10 carbon atoms, which is able to dissolve at least 0.5%-wt neutral polyaniline to be essentially particle-free in optical microscopy.

In particular, the amine compound has the formula $$H_2N\text{—}CH_2\text{—}CH_2\text{—}CH(R_1)\text{—}CH_2\text{—}C(R_2)(R_3)\text{—}CH_2\text{—}NH_2 \tag{II}$$

wherein $R_1$, $R_2$ and $R_3$ independently stand for a $C_{1-6}$ alkyl group.

The preferred curing agent is trimetylhexane diamine (TMDA).

Alternately, as mentioned above, the branched compound can be of dendritic form. Dendrimers are also known as "starburst" polymers. The term "amine dendrimers" denotes hyperbranched molecules having terminal amine groups. As specific examples, the following can be mentioned: polyamidoamines and poly(alkane imine)s such as polyethyleneimine and polypropylene imines.

Dendrimers are prepared in tiers called generations and they have specific molecular weights. The number of terminal amine groups for the amine dendrimers depends on the generation. For generation 1 the number is four and for generation 2 the number is eight.

Dendrimers are produced by, e.g., DSM in the Netherlands and they are commercially available from Aldrich.

The preferred amine dendrimers are those of generations 0 through 5, due to lower cost and ease of manufacture. Most preferably, amine-terminated dendrimers of generations 0 through 2 are employed. N,N,N',N'-tetrakis(3-aminopropyl)-1,4-butanediamine and 4,17-bis(3-aminopropyl)-8,13-bis[3-[bis(3-aminopropyl)amino]propyl]4,8,13,17-tetraazole can be mentioned as specific examples.

The hardening component comprises 0.01 to 10%, preferably 5 to 10%, of non-conducting polyaniline dissolved in the liquid-phase or molten-phase curing agent, calculated from the weight of the curing agent. The non-conducing polyaniline comprises undoped polyaniline having a conductivity of less than $10^{-6}$ S/cm, preferably less than $10^{-8}$ S/cm.

The present curing agent is typically a liquid-phase curing agent capable of curing the curable resin of the resin component and capable of dissolving non-conducting polyaniline. The curing agent can, however, for some applications, such as powder paints, also be capable of curing the resin in molten-state.

The capability of any curing agent of dissolving the non-conducting polyaniline (or of any of the above-mentioned rigid or semirigid polymers) is judged using optical microscopy. Therefore, a polyaniline/curing agent sample which does not exhibit any or only minute amounts of insoluble particles is considered to comprise polyaniline dissolved in the curing agent. The below examples will illustrate this feature in more detail with reference to the attached micrographs.

In addition to polymers as such, the non-conducting polyaniline may comprise a polyaniline complex. The curing agent contains, in addition to dissolved neutral polyaniline, also some dispersed, plasticized neutral polyaniline.

To enhance the anticorrosive activity of the non-conducting polyaniline, an elemental metal or a metal salt can be incorporated into the paint composition by dissolution of dispersion into the curing agent. The elemental metal of such a metal modified composition is preferably selected from the group consisting of zinc, manganese, iron, copper, nickel, titanium, chromium and vanadium. The metal salt is selected from the group consisting of zinc halogenides, zinc chromates, zinc phosphates and lithium halogenides. Also to enhance anticorrosion ability and adhesion to surfaces, it is anticipated that quinone groups can be reacted with the amines of the hardeners, as is well known in the prior art, to achieve quinone-diamine polymers.

The liquid-phase curing agent is substantially free from dispersed polyaniline, as inspected using optical microscopy.

According to a preferred embodiment, the method according to the invention comprises basically the steps of providing a resin component containing a binder, providing a hardening component containing a liquid-phase or molten-phase cross-linking agent for the binder, which agent comprises a basic organic amine having irregularities in the chemical structure of its hydrocarbon chain; and dissolving 0.01 to 10% of a non-conducting polyaniline or other conjucated polymer in the liquid-phase cross-linking agent, said amount of the non-conducting polyaniline being calculated from the weight of the cross-linking agent.

The binder is arranged into a first container optionally together with solvents and additives known per se and the cross-linking agent containing the dissolved non-conducting polyaniline, optionally together with solvents and additives known per se, is arranged into a second container.

The method of forming a paint coating on the surface of an object, comprises the steps of providing a resin component (in the following also called "base component" containing at least one curable resin, providing a hardening component for the base component, containing a liquid phase or molten phase curing agent capable of curing the base component, mixing the base component with the hardening component to provide a curing mixture, applying the curing mixture on the surface of the object, and allowing the mixture to cure so as to form a coating on the surface.

According to the invention, the hardening component comprises an organic amine of the above discussed kind. In the curing agent of the hardening component there is dissolved, before mixing it with the resin component, a non-conducting polyaniline polymer in an amount sufficient to provide a cured coating on the surface of the object containing a maximum of 2% polyaniline or other conjugated polymer.

The paint coating is formed on a surface prone to corrosion when subjected to corrosive conditions. The surface comprises a metal surface. The coating may be doped afterwards.

The overall compositions of the present invention can vary widely. As a preferred optional component, the paint of this invention includes a colorant or pigment. Since conjugated backbone polymers are most often colored, they may provide a color function. In other instances, additional pigments or colorants may be required. Such materials are well known in the art and will not be described in any great detail. Illustrative of useful pigments are metal oxides, such as titanium oxide, zinc oxide, lead oxide, iron oxide and the like; and metal sulfides such as zinc sulfide, cadmium sulfide and the like.

In addition to the pigment, binder, and liquid, which can be solvent or water, a paint also may contain many optional additives, such as defoamers, extenders, thickeners, flow agents, drying agents, catalysts, preservatives, wetting agents, barrier enhancers such as clay and mica, and surfactants, viscosity modifiers and plasticizers to improve various properties of the paint. These optional additives are well known in the art and will not be described herein in any great detail. The selection of the pigments, binder, and additives depends, of course, upon the properties desired in the paint to be made.

According to a preferred embodiment, neutral polyaniline is dissolved in trimethyl hexane diamine (TMDA) which is in the prior art known to be a hardener of an epoxy binder. This leads to essentially particle-free solution as judged based on optical microscope. Such solution is subsequently cross-linked by adding the epoxy resin to allow solid deep blue coating of metal surfaces. Additional additives are anticipated with such formulations, such as color pigments, additional resins or hardeners, as well as additional other anticorrosion pigments in which case synergistic effects are anticipated. It is also anticipated that the concept is not limited to neutral polyaniline or amine cured epoxy resins but other conducting polymers can also be dissolved first in the hardeners of thermosets, followed by addition of the polymeric resin phase and curing. That the order of mixing is the relevant invention, is demonstrated henceforth in the examples to be discussed in some detail, to show that if the same nominal final composition is prepared by first mixing polyaniline in the epoxy resin, such as described in the prior art to render insoluble dispersion, and subsequently cured by adding the hardener, a dispersed morphology is obtained with drastically poorer anticorrosion properties.

The paints according to the present invention can be used for the same purposes as conventional paints, e.g. as topcoats, undercoats, such as fillers and surfacers, primers for improving adhesion of the topcoat to a surface and sealers, which conventionally are used for preventing migration of materials into the topcoat from the surface which is to be painted.

The present invention provides a method of preventing or reducing (retarding) corrosion of metals. According to that method, the metal is provided with protective coating comprising the present paints. The metal can be iron or a ferrous metal alloy, such as steel and steel alloys, or it can comprise another metal, such as aluminum and aluminum alloys.

The surface of the metal is first pre-treated before the paint composition is applied thereon. The pre-treatment step typically comprises the step of removing dirt, dust and fat by cleaning. If necessary, the surface may also be subjected to an abrasive agent such as sand or small steel balls, by scraping, blasting, sanding or scraping so as to remove any surface layer of oxidated metal.

The paint may be applied to form coatings by using procedures known per se. Thus, the paint compositions may be applied in particular by spraying using air or airless spray equipment. Various other industrial methods including steam spraying, dipping, and electrodeposition coating are possible. Application is further possible by powder coating. Naturally, conventional application means such as brushes and rollers can also be employed.

Two-component spray equipment consists of two material lines leading to the spray gun so that two materials, e.g., the resin component and the hardener component, can be mixed in the gun just before application.

The following general methods and specific examples are presented merely to illustrate the invention and are not to be construed as limitations thereon.

Method A: Polymerization of Polyaniline

Polyaniline (PANI) was prepared according to the method described by Y. Cao, A. Andreatta, A. J. Heeger and P. Smith, Polymer 30 (1989) 2305: A solution of 40 ml of freshly distilled aniline (Aldrich), 50 ml of 35% HCl (Fisher) and 400 ml distilled water was prepared in a 1 liter Erlenmeyer flask. The flask was placed in a cooling bath maintained at 0° C.

Polymerization was effected by addition of an oxidant solution consisting of 46 g of $(NH_4)_2S_2O_8$ (Aldrich) and 100 ml of distilled water. After all oxidant was added (over a period of time of 2 hours), the flask was capped and left stirring for an additional 3 hours. The precipitated polymer powder was recovered, filtered and washed with distilled water until the pH of the washing liquid was 6–7. Subsequently, the polymer was washed with methanol until the liquid was clear, and then with ethyl ether to eliminate residual water and methanol. Finally, the polymer was dried in a vacuum oven at room temperature for 48 hours. The molecular weight was $M_n=25,000$ g/mol.

Method B: Measurement of the Corrosion Front Propagation

The coating comprising of the resin(s), the hardener(s), and other additives (as proper for the quality and the type of the coating), as well as the optional conjugated polymers, such as polyaniline, was applied on a test steel plate with specifically cleaned surface (Q-Panel Lab Products, Inc.) using an applicator that allows a layer of uniform thickness of 200 µm. The coating was cured at the temperature recommended by the manufacturer, such as 24 h at 60° C. in the case of epoxy coating. A scratch of width of 1.0 mm was prepared on the said coated plate reaching the steel surface. The shape and dimensions of the scratch were imaged using a digital camera (Kodak DC260) and saved in the memory of computer. 35 g of NaCl (Aldrich) was dissolved in 1 liter of distilled water. The coated steel plate with a scratch was immersed in the said aqueous 3.5% by weight NaCl solution. After a given time, the said plate was taken from the solution for a careful inspection. The adhesion was inspected and subsequently the coating was carefully mechanically removed to leave the scratch including a propagated corrosion front intact. The shape and the dimensions of the corroded scratch were again imaged using the digital camera. By digitally comparing point by point the width of the corroded scratch versus the initial scratch and averaging over the whole length of the scratch, an estimate was obtained for the propagation of corrosion in mm produced during the said immersion time. The experiment was repeated for different concentrations of polyaniline in the coating, different ways of preparation of samples and different immersion times.

EXAMPLE 1
(Outside the Invention)

9.95 g of N-methyl pyrrolidone is poured to an Erlenmeyer flask and 0.05 g of neutral polyaniline prepared as in Method A was added. The mixture was stirred at room temperature for 7 days using a magnetic stirrer. Optical microscopy shows uniformly blue mixture without particles resolvable in optical microscopy, suggesting dissolution.

EXAMPLE 2
(Outside the Invention)

The neutral PANI/N-methyl pyrrolidone solution of Example 1 was applied on a cleaned steel plate (Q-Panel Lab Products, Inc.). The NMP solvent is allowed to evaporate and renders a solid coating on the steel plate.

In conclusion, neutral polyaniline is soluble in N-methyl pyrrolidone. This observation agrees the prior art EP 0 581 886 B1 and U.S. Pat. No. 5,289,213 which disclose also further solvents and methods to obtain coatings by evaporation of the solvent. However, they do not disclose or anticipate a concept to crosslink the solvents instead of evaporation. In particular EP 0 581 886 B1 and U.S. Pat. No. 5,289,213 do not disclosed trimethyl hexane diamine as a solvent. The examples of U.S. Pat. Nos. 5,824,371, 5,645, 890, and 5,441,772 describe further uses of such films and the like as anticorrosion coatings.

EXAMPLE 3
(Outside the Invention)

Figure 1:
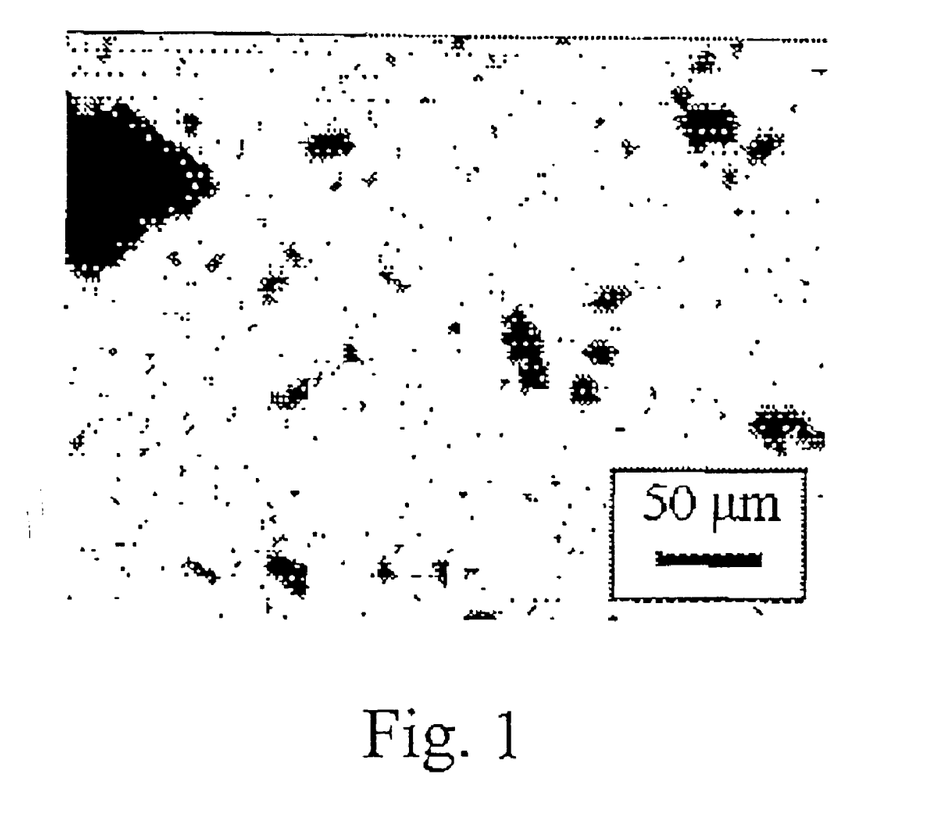
FIG. 1. Optical micrograph of a sample containing 0.5% by weight neutral polyaniline mixed with uncured epoxy resin, showing that neutral polyaniline is not soluble in epoxy resin.

1.636 g of liquid bisphenol A epoxy resins and 0.020 g of neutral polyaniline were mixed in an Erlenmeyer flask using a magnetic stirrer. It is observed that polyaniline does not dissolve in said epoxy resin as there are dispersed particles observed in optical microscopy and the background is essentially colorless, as shown in FIG. 1. 1.656 g of said polyaniline/epoxy resin mixture is further mixed with 0.344 g of basic hardener trimethyl hexane diamine (TMDA). The resulting mixture is applied onto a cleaned steel plate according to Method B and cured at 60° C. for 24 h. A cross-linked epoxy coating containing 1% by weight of neutral polyaniline in the final composition was thus formed. Optical microscopy shows essentially undissolved dispersed polyaniline particles in the cured coating. The anticorrosion properties of said coating were studied using Method B.

In conclusion, undissolved dispersed polyaniline particles are rendered if polyaniline is first mixed in epoxy resin and cured by adding the basic hardener. A wide variety of basic hardeners can be used to show the same result, including diethyltriamine, and isophoron diamine.

Trimethyl hexane diamine (TMDA)

EXAMPLE 4
(Outside the Invention)

Example 3 was repeated mixing 0.010 g neutral polyaniline with 1.644 g epoxy resin, thus leading to 0.5% by weight polyaniline in the final cured coating (TMDA 0.346 g). Optical microscopy shows essentially undissolved dispersed polyaniline particles in the cured coating.

Comparative Example 5
(Outside the Invention)

Figure 2:
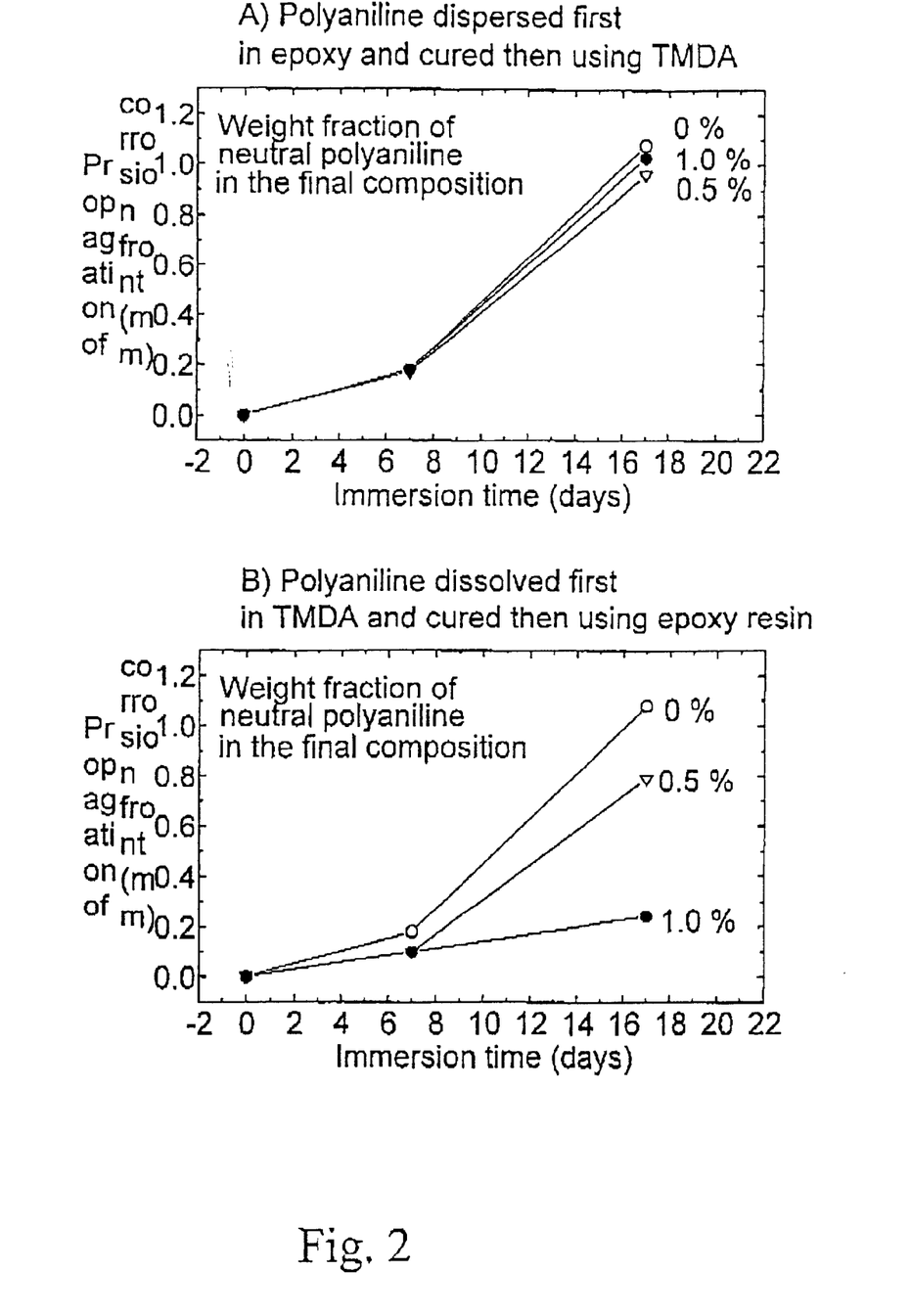
FIG. 2. Propagation of corrosion front in two sets of epoxy coatings which contain nominally the same composition in the final cured coating. A) Polyaniline has been mixed with epoxy where it is unsoluble to render dispersion and the mixture is next cured with trimethyl hexane diamine (TMDA). B) Polyaniline has been mixed TMDA, which is a solvent of neutral polyaniline, and the mixture is next cured by contacting with epoxy resin.

Example 3 was repeated without polyaniline to render a reference sample. The corrosion inhibiting properties based on neutral polyaniline dispersed first in the epoxy resin and subsequently cured using TMDA (examples 3, 4 and 5) were studied using Method B and are summarized in Table 1 and FIG. 2a.

TABLE 1

| Immersion time (days) in aqueous NaCl solution (3.5% by weight) | Average propagation of corrosion (mm) 0% by weight PANI | Average propagation of corrosion (mm) 0.5% by weight PANI | Average propagation of corrosion (mm) 1.0% by weight PANI |
|---|---|---|---|
| 0 | 0 | 0 | 0 |
| 7 | 0.16 | 0.16 | 0.12 |
| 17 | 1.08 | 0.95 | 1.03 |

It can be concluded that when polyaniline has first been dispersed in epoxy resin where it is not soluble and cross-Baked thereafter, a low concentration of polyaniline, such as 1% by weight is not sufficient to render essential anticorrosion effect. Example 3 was repeated to render a sample containing 6.7% by weight polyaniline in the final composition. It reduced the propagation to approximately one half of as compared with the case without polyaniline.

In conclusion, the said method comprising neutral polyaniline dispersed in the epoxy resin (where it is not soluble) prior to cross-linking renders anticorrosion effect on steel but is achieved only at high concentrations of polyaniline. This confirms the results of prior art EP 623 159 B1 anticorrosion effects are disclosed by dispersed neutral polyaniline at high weight fractions of 2–20%, using of wide variety of coatings. Therefore, there is clearly a need for a concept to render anticorrosion effect at lower concentration of polyaniline.

EXAMPLE 6

Figure 3:
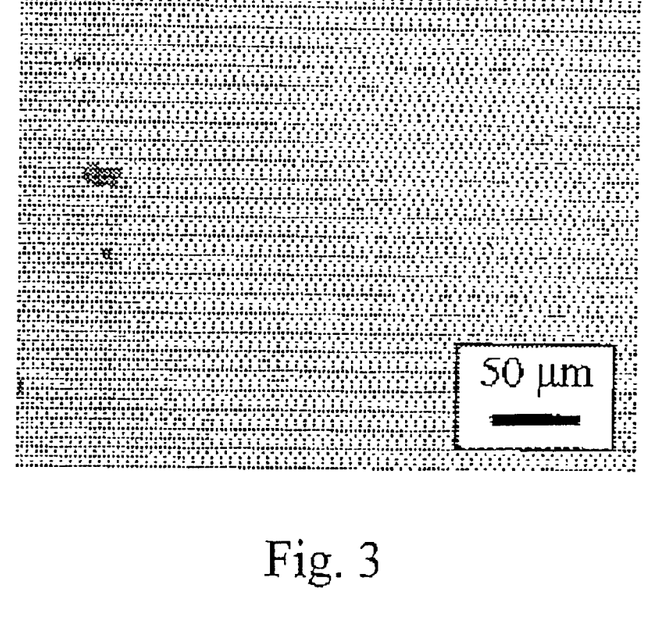
FIG. 3. Optical micrograph of a sample containing 0.5% by weight neutral polyaniline mixed with TMDA, showing that neutral polyaniline is soluble in one of the common basic hardeners of epoxy resin at dilute concentrations.

0.05 g of said neutral polyaniline was mixed in 9.95 g of timethyl hexane diamine (TMDA) using a magnetic stirrer at room temperature in an Erlenmeyer flask. After mixing for 1 day, insoluble polyaniline was manifest in optical microscopy. However, as mixing was continued for 1 week, the mixture turned out to be homogeneously blue. Optical microscopy revealed hardly any insoluble particles, as shown in FIG. 3. It can be concluded that polyaniline dissolves at dilute concentrations, such as 0.5% by weight, in a basic hardener of epoxy resin, i.e. TMDA.

EXAMPLE 7

Example 6 was repeated using a higher concentration: 0.50 g of EB was mixed with 8.61 g of TMDA for 1 week. The mixture was deep blue. However, optical microscopy shows some inhomogeneity. One can conclude that neutral polyaniline is partially soluble in TMDA at high concentration, such as 5.8% by weight, and the deep blue particles are plasticised neutral polyaniline.

EXAMPLE 8
(Outside the Invention)

Example 7 was repeated using epoxy resin: 0.50 g of neutral polyaniline was mixed with 8.61 g of epoxy resin for 1 week. Optical microscopy shows essentially colorless dispersed polyaniline particles within the epoxy resin, indicating essentially no solubility.

EXAMPLE 9

0.364 g of the deep blue mixture of Example 7 was mixed with 1.636 g of epoxy resin and cured according to method B thus leading to 1.0% by weight polyaniline in the final cured coating. A deep blue solid coating was rendered on test steel plate. The corrosion front propagation was inspected using the Method B.

Comparative Example 10

Example 9 was repeated with different amounts of neutral polyaniline dissolved in TMDA and cured thereafter using epoxy resin. Deep blue coatings on steel were obtained, showing corrosion inhibiting properties shown in Table 2 and FIG. 2b.

TABLE 2

| Immersion time (days) in aqueous NaCl solution (3.5% by weight) | Average propagation of corrosion (mm) 0% by weight PANI | Average propagation of corrosion (mm) 0.5% by weight PANI | Average propagation of corrosion (mm) 1.0% by weight PANI |
|---|---|---|---|
| 0 | 0 | 0 | 0 |
| 7 | 0.16 | 0.11 | 0.11 |
| 17 | 1.08 | 0.78 | 0.23 |

Significant inhibition in corrosion front propagation was observed at the concentration of 1% by weight of neutral polyaniline if the latter was first dissolved in the TMDA hardener before cross-linking. Note that FIG. 2a showed, in agreement with the prior art EP 623 159 B1, that using dispersions small amounts are not sufficient to render anticorrosion effect.

The following example will demonstrate that it is not straightforward to achieve solutions in the basic hardeners of epoxies.

Comparative Example 11
(Outside the Invention)

Example 6 was repeated with other basic hardeners of epoxy. See Table 3.

TABLE 3

Figure 4:
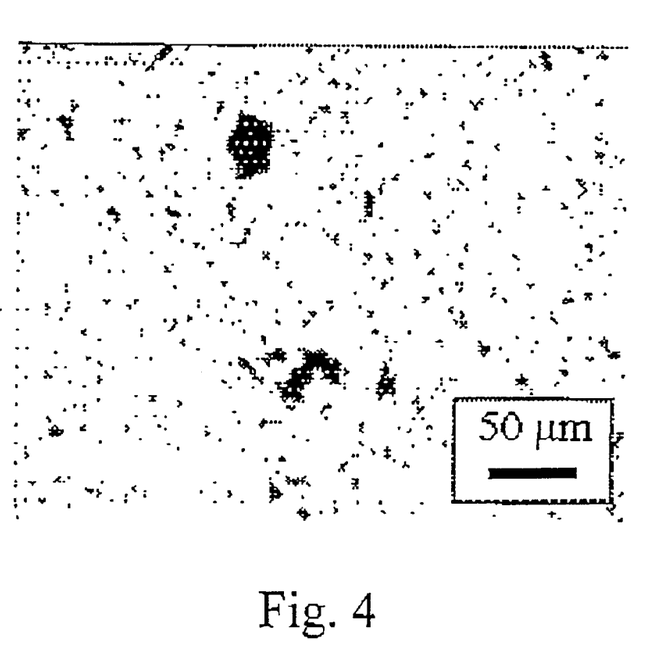
FIG. 4. Optical micrograph of a sample containing 0.5% by weight neutral polyaniline mixed with isophorondiamine, showing that neutral polyaniline is not generally soluble in the basic hardeners of epoxy resin at dilute concentrations.

| | | $\delta\sqrt{MPa}$ | Solubility |
|---|---|---|---|
| Ethylenediamine | $H_2N—C_2H_4—NH_2$ | 23.7 | Particles |
| Diethylenetriamine | $H_2N—C_2H_4—NH—C_2H_4—NH_2$ | 22.4 | Small particles |
| Triethylenetetramine (monohydrate) | $H_2N—(C_2H_4—NH)_2—C_2H_4—NH_2$ | 21.8 | Particles |
| Tetraethylenepentamine | $H_2N—(C_2H_4—NH)_3—C_2H_4—NH_2$ | 21.4 | Clear after 3 days but turns cloudy in 1 week |
| Pentaethylenehexamine | $H_2N—(C_2H_4—NH)_4—C_2H_4—NH_2$ | 21.1 | Small particles |
| Trimethyl hexane diamine | $H_2N—C_2H_4—CH(CH_3)—CH_2—C(CH_3)_2—CH_2—NH_2$ | 18.3 | Clear, FIG. 3. |
| Isophoron diamine | | 22.2 | Particles, FIG. 4 |

Several conclusions can be made: Firstly, it is not a common property to have the basic hardener of epoxy resin to be simultaneously a solvent of polyaniline. Secondly, the solubility parameter of polyaniline is $\delta=22\sqrt{MPa}$ (L.W. Schacklette, Synthetic Metals 65 (1994) 123). Therefore, based on solubility parameters it is astonishing to observe that timethyl hexane diamine is a better solvent than e.g. triethylenetetramine monohydrate.

Trimethyl hexane diamine is a branched molecule where the internal aggregation is sterically inhibited.

Comparative Example 12

Example 10 was repeated using 2 weeks immersion time. Samples were prepared and examined using Method B (see Table 4).

realized the principle, it is well anticipated that there are also other paint and coating formulations where, instead of just dispersing the conjugated polymer in the polymeric binder (as has been performed in the prior art), one could first identify the hardeners thereof that could also dissolve said conjugated polymer. Examples include in particular thermosets and coatings where basic aminic hardeners are used, in more particular amine cured phenolic resins, polyurethanes, cyanate thermosets. It is also anticipated that combination of the present invention and conventional anticorrosion additives, such as zinc chromate could have synergistic anticorrosion properties.

Example 14

2.27 g ZnO and 18.23 g dodecyl benzene sulphonic acid (DBSA) (Tokyo Kasei) were reacted in anhydrous ethanol to

TABLE 4

Figure 5:
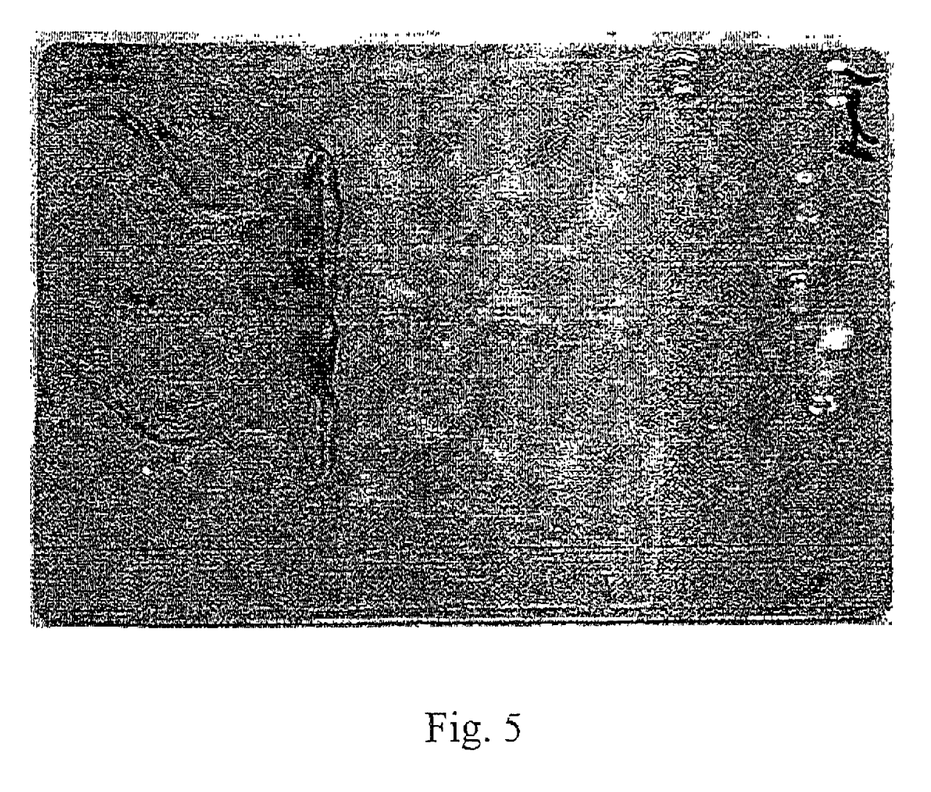
FIG. 5: Typical example of TMDA/epoxy resin coating on steel plate. Sample has been prepared using Method B. A scratch has been prepared and the sample has been exposed to 3.5% NaCl solution for 2 weeks. The coating has been removed after the exposion to show the progress of the corrosion from the scratch.
Figure 6:
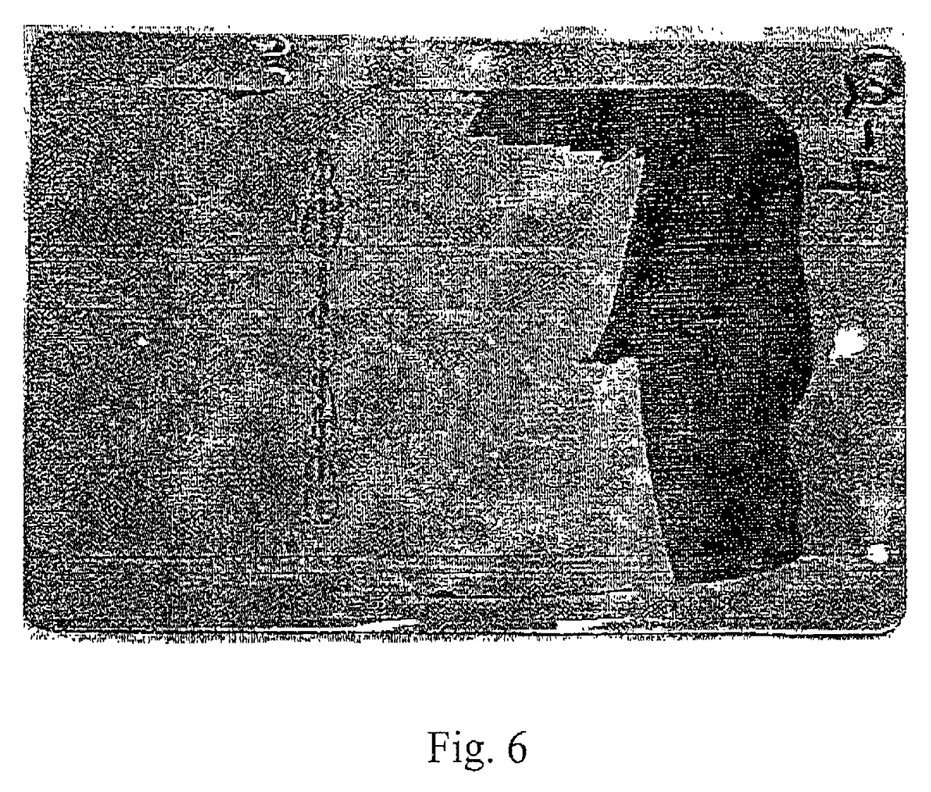
FIG. 6: Typical example of TMDA/epoxy resin containing 1% of neutral polyaniline, polyaniline dissolved fast in TMDA and then cured using epoxy resin. Sample has been prepared using Method B. A scratch has been prepared and the sample has been exposed to 3.5% NaCl solution for 2 weeks. The coating has been removed after the exposion to show the progress of the corrosion from the scratch.
Figure 7:
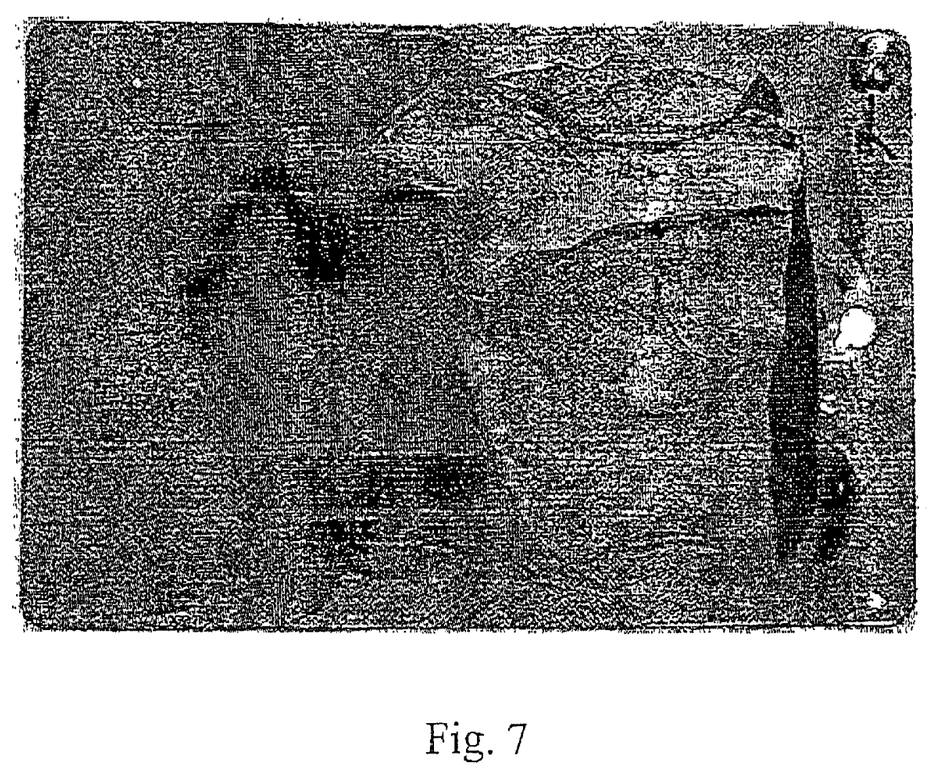
FIG. 7: Typical example of TEPA/epoxy resin containing 1% of neutral polyaniline, polyaniline dissolved first in tetraethylene pentamine (TEPA) and then cured using epoxy resin. Sample has been prepared using Method B. A scratch has been prepared and the sample has been exposed to 3.5% NaCl solution for 2 weeks. The coating has been removed after the exposion to show the progress of the corrosion from the scratch.

| Hardener | Amount of neutral polyaniline by weight in the final cured coating | See FIG. | Corrosion propagation compared to reference sample |
|---|---|---|---|
| Trimethyl hexane diamine | 0% | FIG. 5. | (Reference) |
| Trimethyl hexane diamine | 1.0% | FIG. 6. | Smaller propagation |
| Tetraethylene pentamine | 1.0% | FIG. 7. | Wider propagation |

It can be thus concluded that coatings prepared using tetraethylene pentamine render much poorer anticorrosion properties than the present invention.

Comparative Example 13

Example 11 was repeated for diethylene triamine which additionally contained 0.5% by weight LiCl. An improvement in the solubility was observed, such as 0.5% by weight of neutral polyaniline dissolves almost totally in diethylene triamine when using 0.5% by weight LiCl. Such mixtures can be cross-linked by adding epoxy resin and curing as in Method B.

The examples showed that significant improvement of anticorrosion properties are obtained when a basic hardener of epoxy resin is identified which simultaneously acts as a solvent for neutral polyaniline, followed by addition of the epoxy resin. The basic invention of this work is the observation that selected materials can astonishingly have this dual function. Having understood this, it becomes natural to anticipate that similar behavior can be of more general nature, albeit very material dependent. One can, for example anticipate, that selected other substituted or unsubstituted conjugated polymers can be soluble in hardeners of epoxy resins, such as polypyrrole, pyridine containing polymers, polythiophenes and pyrolyzed polyacrylonitriles. Having prepare zinc dodecyl benzene sulphonate $Zn(DBS)_2$ (see Ruokolainen et al. Macromolecules 29 (1995) 7779). 0.795 g of $Zn(DBS)_2$ and 0.205 g of neutral polyaniline were dissolved in about 100 g N-methyl pyrrolidone and stirred magnetically for 2 days. N-methyl pyrrolidone was subsequently removed by vacuum distillation and the material was dried. FTIR showed that a nearly stoichiometric composition $PANI(Zn(DBS)_2)_{0.5}$ is formed where the iminic nitrogens have been coordinated with the $Zn^{2+}$ cations of $Z(DBS)_2$. This concept renders a highly branched comb-shaped supermolecule where dodecyl tails are complexed to the polyaniline backbone using coordination bonds. Supramolecular chemistry is widely described by J.-M. Lehn, Supramolecular Chemistry, VCH, Weinheim, 1995. Such akyl tails are anticipated to modify the solubility. Instead of the alkyl tails, the sulphonic acids can contain other functional moieties. An example is given by reacting 1 mole ZnO and 2 moles camphor sulphonic acid (CSA) (Aldrich) to allow zinc camphor sulphonate $Zn(CS)_2$ and forming the coordinate complex $PANI(Zn(CS)_2)_{0.5}$ with the iminic nitrogens of polyaniline. Such supermolecules are anticipated to have increased solubility to common solvents due to the hydrogen bonding carbonyl groups of $Zn(CS)_2$ to allow solubility in hardeners of paints and coatings. Therefore, it is anticipated that construction of physically bonded supermolecules based of neutral polyaniline or other conjugated polymers with selected additives would allow increased solubility in a wider variety of hardeners of paints and coatings.

What is claimed is:

1. A curable paint composition, comprising
   a) a base component containing at least one curable resin,
   b) a non-conducting polyaniline, and
   c) a liquid-phase or molten-phase curing agent capable of curing said curable resin and having a solubility parameter for said non-conducting polyaniline of at least 17 $MPa^{1/2}$, said curing agent comprising an organic amine compound having at least two primary amine functions linked together by a hydrocarbon chain which is optionally interrupted by at least one heteroatom, said amine compound exhibiting irregularities in the chemical structure of its hydrocarbon chain.

2. The paint composition according to claim 1, wherein the curing agent comprises a basic amine.

3. The paint composition according to claim 1 or 2, wherein the curing agent comprises an amine containing a hydrocarbon chain interrupted by at least one heteroatom selected from the group of sulphur, silicon, nitrogen and oxygen.

4. The paint composition according to claim 1, wherein the irregularities of the hydrocarbon chain of the amine comprise chain branching.

5. The paint composition according to claim 4, wherein the chain branching comprises hydrocarbon chains optionally interrupted by heteroatoms and bonded to at least one carbon atom or heteroatom of the hydrocarbon chain interlinking the amine functions.

6. The paint composition according to claim 1, wherein the irregularities of the hydrocarbon chain comprise double bonds between two carbon atoms or between a heteroatom and an adjacent carbon atom.

7. The paint composition according to claim 1, wherein the curing agent comprises a branched-chain aliphatic amine compound with at least two primary amine groups.

8. The paint composition according to claim 6, wherein the curing agent comprises an unsaturated aliphatic amine compound with at least two primary amine groups.

9. The paint composition according to claim 1 or 7, wherein the amine compound has the formula $$H_2N-A-NH_2 \quad (I)$$

wherein A stands for a branched alkylene chain having 3 to 10 carbon atoms or a linear or branched alkenylene chain having 2 to 10 carbon atoms.

10. The paint composition according to claim 1 or 7, wherein the amine compound has the formula $$H_2N-CH_2-CH_2-CH(R_1)-CH_2-C(R_2)(R_3)-CH_2-NH_2 \quad (II)$$

wherein $R_1$, $R_2$ and $R_3$ independently stand for a $C_{1-6}$ alkyl group.

11. The paint composition according to claim 10, wherein the curing agent is trimethyl hexane diamine.

12. The paint composition according to claim 1 or 7, wherein the amine compound is of dendritic form.

13. The paint composition according to claim 12, wherein the amine compound is a polyamidoamine or poly(alkane imine), such as polyethyleneimine or polypropylene imines.

14. The paint composition according to claim 1, wherein the hardening component contains 0.01 to 10%, preferably 5 to 10%, of non-conducting polyaniline which, as judged using optical microscopy, is dissolved in the liquid-phase or molten-phase curing agent, the percentages being calculated from the weight of the curing agent.

15. The paint composition according claim 1, wherein the non-conducting polyaniline comprises undoped polyaniline having a conductivity of less than $10^{-6}$ S/cm, preferably less than $10^{-8}$ S/cm.

16. The paint composition according to claim 15, wherein the non-conducting polyaniline comprises emeraldine base, nigraline or leucoemeraldine or a polyaniline base in any other oxidation state.

17. The paint composition according to claim 16, wherein the non-conducting polyaniline comprises a polyaniline complex.

18. The paint composition according to claim 1, wherein the curing agent contains, in addition to dissolved neutral poly aniline, also some dispersed, plasticized neutral polyaniline.

19. The paint composition according to claim 1, wherein the hardening agent further contains an elemental metal or a metal salt dissolved or dispersed in the curing agent.

20. The paint composition according to claim 1, wherein the elemental metal is selected from the group consisting of zinc, manganese, iron, copper, nickel, titanium, chromium and vanadium.

21. The paint composition according to claim 1, wherein the metal salt is selected from the group consisting of zinc halogenides, zinc chromates, zinc phosphates and lithium halogenides.

22. The paint composition according to claim 1, wherein the curable resin is selected from the group consisting of epoxy resins and amine resins.

23. The paint composition according to claim 22, wherein the binder comprises an epoxy resin consisting of condensates of bisphenol and having glycidyl groups.

24. The paint composition according to claim 1, wherein the liquid-phase curing agent is substantially free from dispersed polyaniline, as judged using optical microscopy.

25. A method of preparing a paint composition, comprising the steps of
   providing a resin component containing a binder;
   providing a hardening component containing a liquid-phase or molten-phase cross-linking agent for the binder, which agent comprises an organic amine compound having at least two primary amine functions linked together by a hydrocarbon chain which is optionally interrupted by at least one heteroatom, said organic amine having irregularities in the chemical structure of its hydrocarbon chain; and
   dissolving 0.01 to 10 weight-% of a non-conducting polyaniline, based on the weight of the cross-linking agent, in the liquid-phase or molten-phase cross-linking agent.

26. The method according to claim 25, wherein the binder comprises a curable epoxy resin or amine resin.

27. The method according to claim 26, wherein the binder comprises an epoxy resin consisting of condensates of bisphenol and having glycidyl groups.

28. The method according to any of claims 25 to 27, wherein the cross-linking agent comprises a basic aliphatic amine having the formula $$H_2N-A-NH_2 \quad (I)$$

wherein A stands for a branched alkylene chain having 3 to 10 carbon atoms or a linear or branched alkenylene chain having 2 to 10 carbon atoms.

29. The method according to claim 28, wherein the cross-linking agent comprises a basic aliphatic amine having the formula (II)

wherein $R_1$, $R_2$ and $R_3$ independently stand for a $C_{1-6}$ alkyl group.

30. The method according to any of claims 25 to 27, wherein the amine compound is of dendritic form.

31. The method according to claim 25, wherein the binder is arranged into a first container optionally together with solvents and additives known per se, and the cross-linking agent containing the dissolved non-conducting polyaniline, optionally together with solvents and additives known per se, is arranged into a second container.

32. A method of forming a paint coating on the surface of an object, comprising the steps of providing a resin component containing at least one curable resin, providing a hardening component for the resin component, containing a liquid-phase curing agent which is an organic amine compound having at least two primary amine functions linked together by a hydrocarbon chain that is optionally interrupted by at least one heteroatom and that has irregularities in the chemical structure of the hydrocarbon chain and which is capable of curing said resin of the resin component, dissolving a non-conducting polyaniline polymer, in an amount sufficient to provide a cured coating on the surface of the object containing a maximum of 2% polyaniline, in the curing agent before mixing it with the resin component, mixing the resin component with the hardening component to provide a curing mixture, applying the curing mixture on the surface of the object, and allowing the mixture to cure so as to form a coating on the surface.

33. The method according to claim 32, comprising forming the paint coating on a surface prone to corrosion when subjected to corrosive conditions.

34. The method according to claim 33, wherein the surface comprises a metal surface.

35. The method according to any of claims 32 to 34, wherein the curable resin is selected from the group of epoxy resins and amine resins.

36. The method according to any of claims 32 to 34, wherein the coating is doped.

37. A coated metal substrate comprising a metal substrate having a surface prone to corrosion when the metal substrate is subject to corrosive conditions, and a coating covering at least a part of the surface, said coating comprising a polymeric binder cross-linked with an organic amine compound having at least two primary amine functions linked together by a hydrocarbon chain which is optionally interrupted by at least one heteroatom, said amine compound exhibiting irregularities in the chemical structure of its hydrocarbon chain, said coating further comprising non-conducting polyaniline homogeneously distributed throughout the coating in a total amount of 0.1 to 2% by weight of the coating.

38. The coated metal substrate according to claim 37, wherein the polymeric binder of the coating comprises an epoxy resin cross-linked with a curing agent having the formula (I)

wherein A stands for a branched alkylene chain having 3 to 10 carbon atoms or a linear or branched alkenylene chain having 2 to 10 carbon atoms.

39. The coated metal substrate according to claim 38, wherein the polymeric binder of the coating comprises an epoxy resin cross-linked with an amine compound in dendritic foam.

* * * * *